(12) United States Patent
Amman et al.

(10) Patent No.: US 7,100,431 B2
(45) Date of Patent: Sep. 5, 2006

(54) DEVICE FOR DETERMINING THE EXHAUST GAS RECIRCULATION RATE OF AN INTERNAL COMBUSTION ENGINE

(75) Inventors: Markus Amman, Weinstadt (DE); Nikolas Fekete, Stuttgart (DE); Dirk Herbstritt, Durmersheim (DE); Aleksandar Knezevic, Friedrichshafen (DE); Ralf Müller, Deggenhausertal (DE); Carsten Plog, Markdorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/039,652

(22) Filed: Jan. 19, 2005

(65) Prior Publication Data

US 2005/0145022 A1   Jul. 7, 2005

Related U.S. Application Data

(63) Continuation-in-part of application No. PCT/EP03/07031, filed on Jul. 2, 2003.

(30) Foreign Application Priority Data

Jul. 23, 2002 (DE) ................. 102 33 362

(51) Int. Cl.
*G01M 19/00* (2006.01)
(52) U.S. Cl. ............ 73/118.1; 73/117.2; 73/116; 73/23.31; 73/117.3
(58) Field of Classification Search ........... 73/118.1, 73/116, 117.2, 117.3, 23.31
See application file for complete search history.

(56) References Cited

U.S. PATENT DOCUMENTS

| 4,294,220 A | 10/1981 | Yasuhara |
| 5,357,749 A | 10/1994 | Ohsuga |
| 5,996,337 A | 12/1999 | Blosser |
| 6,446,617 B1 * | 9/2002 | Bianchi et al. ........ 123/568.17 |
| 6,810,725 B1 * | 11/2004 | Henderson et al. ........ 73/118.1 |
| 6,851,311 B1 * | 2/2005 | Nakada et al. ........... 73/204.26 |
| 2002/0046947 A1 | 4/2002 | Lawless |

FOREIGN PATENT DOCUMENTS

| DE | 30 01 413 A1 | 8/1980 |
| DE | 197 34 494 C1 | 10/1998 |
| DE | 100 07 010 A1 | 8/2001 |
| EP | 0 574 614 A1 | 12/1993 |

* cited by examiner

*Primary Examiner*—Edward Lefkowitz
*Assistant Examiner*—Freddie Kirkland, III
(74) *Attorney, Agent, or Firm*—Klaus J. Bach

(57) ABSTRACT

In a device for determining an exhaust gas recirculation rate (EGR) in an internal combustion engine, wherein the device includes a sensor unit, which in a first region is exposed to an exhaust-gas atmosphere from an exhaust gas recirculation line and in a second region is exposed to an exhaust gas/fresh air atmosphere in an intake line of the internal combustion engine downstream of a location where the exhaust gas recirculation line opens into the intake line, the sensor unit disposed in the intake line is tubular with the inner side of the sensor unit being exposed to the exhaust gas atmosphere and the outer side of the sensor unit being exposed to the exhaust gas/fresh air atmosphere. The sensor unit is preferably positioned centrally within the intake line away from the wall of the intake line.

6 Claims, 1 Drawing Sheet

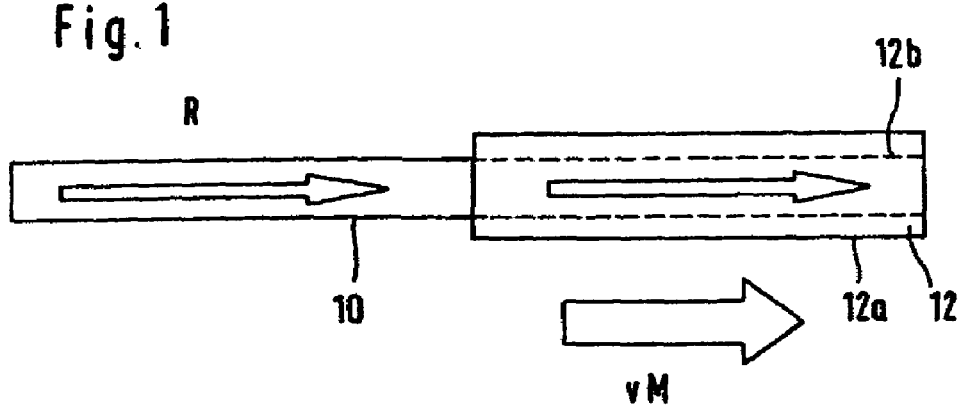
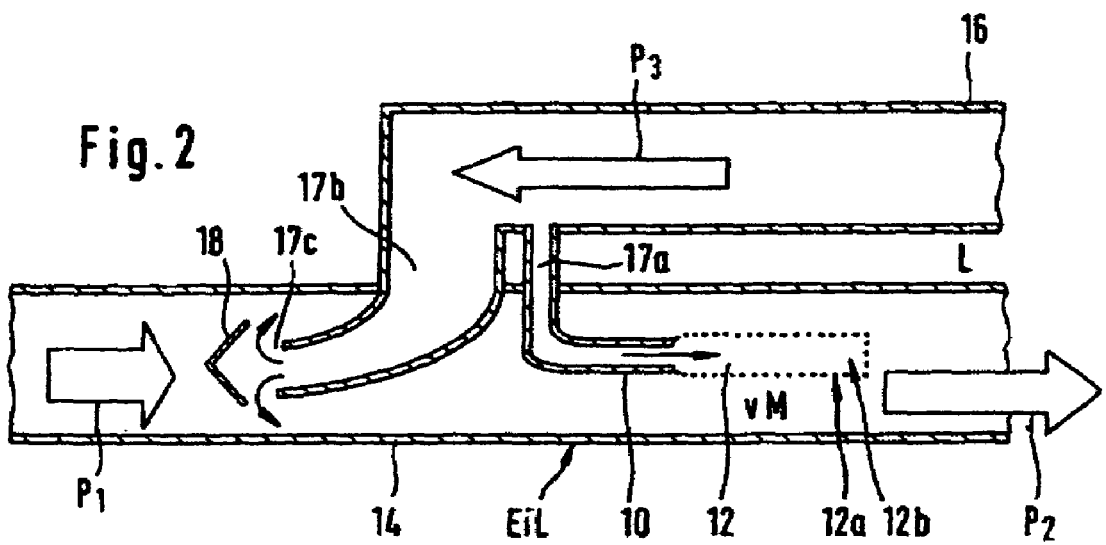
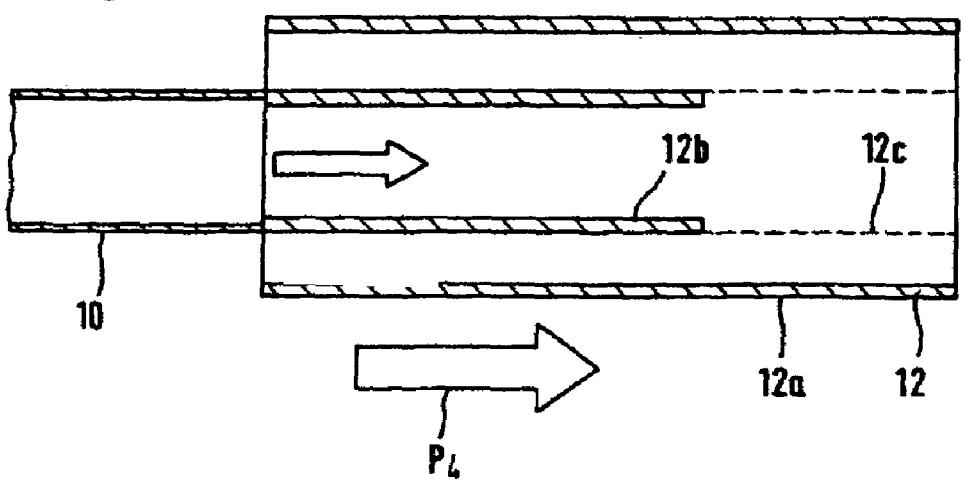

DEVICE FOR DETERMINING THE EXHAUST GAS RECIRCULATION RATE OF AN INTERNAL COMBUSTION ENGINE

CROSS-REFERENCE TO RELATED APPLICATION

This is a continuation-in-part application of international application PCT/EP03/07031 filed Jul. 2, 2003 and claiming the priority of German application 102 33 362.9 filed Jul. 23, 2002.

BACKGROUND OF THE INVENTION

The present invention relates to emission control apparatus for an internal combustion engine, and, in particular, to a device for determining the exhaust gas recirculation rate of an internal combustion engine.

One known way of lowering NOx emissions from spark-ignition or diesel engines is what is known as exhaust gas recirculation (EGR). In particular, the temperature-sensitive NOx emission is reduced by admixing exhaust gases to the fresh air prior to combustion. Usually, exhaust gas is added to an intake line from an exhaust pipe of the internal combustion engine via an exhaust gas recirculation line. The recirculation rate of the exhaust gas, i.e., the quantity of the exhaust gas stream which is admixed with the fresh air stream in the intake line in relation to the combustion air quantity, is controlled by a controller unit in adaptation to set values predetermined as a function of the particular operating point. The extent to which the exhaust gas recirculation rate can be increased with a view to further reducing the NOx emissions is subject to different limits, for example as a function of the operating point, specifically by the particulate emissions, which increase above certain recirculation rates, the fuel consumption and by the deterioration in the smooth running of the internal combustion engine.

Controlling the exhaust gas recirculation rate requires the ongoing recording of the prevailing recirculation conditions during operation of the internal combustion engine.

European Patent Application No. 057 4 614 A1 discloses a method for controlling the exhaust gas recirculation rate which, to determine the actual value of the recirculated exhaust gas mass flow, measures the pressure drop at a venturi nozzle in the exhaust gas recirculation passage and determines the through-flow from the pressure difference.

German Patent Application DE 100 070 10 A1 discloses a sensor unit for determining the exhaust gas recirculation rate of an internal combustion engine. The sensor unit is acted on by the exhaust gas atmosphere inside the exhaust gas recirculation line, on one side, and by the atmosphere comprising exhaust gas and fresh air which is present within the intake line of the internal combustion engine downstream of the location where the exhaust gas recirculation line opens out, on the other side. The two gas atmospheres acting on the sensor unit being kept separate from one another.

German Patent DE 197 34 494 C1 discloses a method for operating an internal combustion engine with recirculation of exhaust gases from an exhaust pipe into an intake line through an exhaust gas recirculation passage. To allow the maximum lowering of emissions by exhaust gas recirculation with optimally accurate recording and control of the exhaust gas recirculation rates, it is provided that the prevailing oxygen content in the gas streams upstream and downstream of the location where the exhaust gas recirculation passage opens out into the intake line be measured by means of sensors and that the controller unit accurately determines the recirculation rate from the measurement results.

To determine the EGR rate, it is necessary to respond as quickly as possible to changes in concentration at a sensor, in order, by means of an engine control, to control or limit the emission of pollutants.

In a motor vehicle, conventional positioning of a sensor on the wall of the induction manifold represents a problem insofar as a sensor positioned in this way is unable to react optimally to rapid changes in, for example, an NOx concentration, since the flow velocity of the gas that is to be detected drops towards zero at the wall of the manifold. For this reason, inter alia, a change in the gas composition will affect the sensor signal with a time delay, since the new or altered gas composition has to flow over the entire sensor surface.

It is an object of the present invention to determine an EGR rate in as simple a way as possible, but with the maximum possible accuracy.

SUMMARY OF THE INVENTION

The present invention utilizes a sensor unit which is of tubular design to make it possible, in a structurally simple way, to position the sensor-sensitive regions of the sensor unit at a distance from wall regions of respective flow lines. This is done so that the sensor-sensitive regions may be arranged at locations where the through-flow quantities are greater. In this way, it is possible to detect changes in the gas concentrations significantly more quickly compared to conventional solutions. Furthermore, the present invention's sensor units of tubular design have a high mechanical stability. It has been found that the conventional planar sensors which were embedded in a gas tight manner in a suitable holder are not as mechanically stable. For example, in operation, under cyclical thermal loads, planar sensors were exposed to high mechanical loads caused by different coefficients of thermal expansion of holder and sensor material, the mechanical stresses caused as a result, may cause the planar sensor to fail as a result of cracks forming. With the EGR sensor unit of tubular design in accordance with the present invention, it is possible to substantially avoid the formation of cracks as a result of cyclical thermal load changes. Furthermore, there is no need for complex seals with a sensor unit designed in the form of a tube.

It has been found preferable for the sensor unit of the present invention to have electrodes formed by thin-film or thick-film technology on the inner side and/or the outer side. By way of example, if a sensor thin film is deposited on a porous carrier substrate, it is possible to keep production costs very low. By way of further example, mention may be made of what is known as the dip coating process from a sol. This process is a wet-chemical process for producing ceramic thin films that is very inexpensive to implement. Furthermore, mention should be made of EVD (electrochemical vapor deposition) processes, and PVD (plasma vapor deposition) processes.

It is preferable to provide for the sensor unit to be arranged substantially centrally in the intake line, in particular an induction manifold. This measure allows the sensor-sensitive regions of the sensor unit to be positioned in a simple way, away from the wall regions of the intake line, at locations where the quantities of gas flowing through are greatest, so that very accurate measurements are possible.

According to a preferred embodiment of the device according to the invention, a sensor-sensitive region of the sensor unit formed on the outer side has a greater extent in the direction of flow of at least one of the atmospheres which are to act on the sensor unit than a sensor-sensitive region formed on the inner side. This measure can be realised, for example, by a cylindrical sensor unit in which the sensor-sensitive region formed on the outer side has a greater axial length than the sensor-sensitive region formed on the inner side. This makes it possible to effectively avoid influencing a sensor-active material on the inner side as a result of a return flow of an atmosphere acting on the outer side of the sensor unit.

It has proven expedient for the sensor unit to be designed with an NO-selective membrane on the inner side and/or the outer side. A sensor-sensitive material of this type has proven to be available at relatively low cost and allows accurate measurement to be carried out in a simple way.

Finally, it is preferable for a baffle plate to be arranged in the region of the location where the exhaust gas recirculation line opens out into the intake line. A plate of this type, on which the exhaust gas flowing into the intake line impinges, makes it possible to achieve particularly thorough mixing of exhaust gas and fresh air. It is expedient for the exhaust gas flowing into the intake line initially to flow in the opposite direction to the direction of flow of the fresh air and in the process to strike the baffle plate.

BRIEF DESCRIPTION OF THE DRAWINGS

For a better understanding of the invention reference may be had to the accompanying drawings exemplary of the invention, in which;

FIG. 1 shows a diagrammatic, lateral sectional view of a preferred embodiment of the device according to the invention, in which a sensor unit has been applied to a carrier tube;

FIG. 2 shows a diagrammatic, lateral view of the sensor unit shown in FIG. 1 in a preferred position in an induction manifold; and, FIG. 3 shows a further preferred embodiment of the sensor unit according to the invention in the form of a diagrammatic, lateral sectional view.

DESCRIPTION OF THE PREFERRED EMBODIMENTS

With reference to FIG. 1, there is shown a tubular sensor unit 12 which has been applied to a feed pipe 10. The outer side of the sensor unit 12 is designed as the outer electrode 12a or first sensor, and the inner side is designed as an inner electrode 12b or second sensor. The respective electrodes are applied to a selectively ion-conducting material. An evaluation unit which is operatively connected to the sensor unit 12 through the sensors 12a, 12b thereof is not illustrated.

The membranes which have been applied to the inner and outer sides (12a, 12b) are selectively conductive with respect to an ionised gas which is present in the atmospheres which are to be considered, as will now be explained in more detail with reference to FIG. 2.

In FIG. 2, an intake line or manifold in which the sensor unit according to the present invention is arranged is denoted by 14. Arrow P1 indicates that fresh air enters the manifold 14 (from the left in the illustration shown in FIG. 2). An exhaust-gas recirculation line is denoted by 16 and can be used to recirculate exhaust gases from an engine (not shown) into the induction section or manifold 14. It can be seen that the recirculated exhaust gas (which is indicated by means of arrow P3) is introduced into the manifold 14 via a first feedline 17a and a second feedline 17b. The exhaust gas which flows in via the feedline 17b preferably flows onto a baffle plate 18 (in a region 17c where the recirculation line opens out) and is then mixed with the fresh air flowing in manifold 14.

The end of the feedline 17a is adjoined by the feed pipe 10, which has already been described with reference to FIG. 1 and to which the sensor unit 12 has been applied.

It is apparent from FIG. 2 that the tubular sensor unit 12 is acted on by a fresh air/exhaust gas atmosphere on the outer side 12a and by an exhaust gas atmosphere on the inner side 12b.

It should be noted that the sensor unit 12 according to the invention can use any desired types of sensors. In addition to the above-mentioned sensors based on selective ion conduction, mention should also be made of resistive oxygen sensors, ammeter oxygen sensors, ammeter NOx sensors and other gas sensors which are selective with respect to a component that is present in the exhaust gas.

As can also be seen from FIG. 2, the sensor unit 12 is preferably arranged substantially centrally in the manifold 14 and away from the wall of the manifold 14. This aspect of the invention provides for the maximum flow velocity of the fresh air/exhaust gas flow to act on the outer side 12a of the sensor 12, with the result that the response time of the sensor unit 12 is effectively reduced.

Finally, a preferred embodiment of the sensor unit 12 according to the present invention will be described with reference to FIG. 3. This figure shows the inner-side electrode 12b, which is coated with an ion-selective membrane, and the corresponding outer-side electrode 12a, which (for example in an arrangement as described in connection with FIG. 2) is acted on by an exhaust gas atmosphere on the inner side 12b and by an exhaust gas/fresh air atmosphere on the outer side 12a. To prevent a return flow of the exhaust gas/fresh air atmosphere in the opposite direction to the main direction of flow (indicated here by means of arrow P4) back into the inner region of the sensor unit from distorting the measurement result, the sensor-sensitive region of the inner electrode 12b is designed to be shorter in the axial direction, i.e., in the direction of the main extent of the sensor unit 12 or in the direction of flow P4, than the outer electrode 12a. This makes it possible by outer electrode 12a extending beyond the inner electrode 12b to ensure that fresh air/exhaust gas mixture which flows back into the inner region of the sensor unit 12 does not affect the measurement result.

What is claimed is:

1. A device for determining an exhaust gas recirculation rate (EGR) in an internal combustion engine, having an exhaust gas recirculation line (16, 17b) extending to an intake line (14), said device comprising a sensor unit (12) with a first region exposed to an exhaust gas atmosphere in the exhaust gas recirculation line (16, 17b) and a second region exposed to an exhaust gas/fresh air atmosphere in the intake line (14) of the internal combustion engine downstream of a location (17c) where the exhaust gas recirculation line (16, 17b) joins said intake line (14), said sensor unit (12) being tubular and being disposed within the intake line (14) so as to extend therein axially spaced from the wall thereof, said sensor unit (12) being in communication with the exhaust gas recirculation line (16) and having an inner side (12b) exposed to the exhaust gas atmosphere and an outer side (12a) exposed to the exhaust gas/fresh air atmosphere.

2. The device of claim 1, wherein said tubular sensor unit 12) has electrodes forming sensitive regions applied to said sensor unit (12) by a thin-film or thick-film technique on at least one of the inner side (12b) and the outer side (12a) of said sensor unit (12).

3. The device of claim 2, wherein said sensor-sensitive region (12a) of said sensor unit (12) formed on said outer side extends axially in the main direction of flow of at least one of said atmospheres which act on said sensor unit (12) a predetermined axial length (12c) beyond said sensitive region (12b) formed on the inner side of said sensor unit (12).

4. The device of claim 2, wherein at least one of the inner side (12b) and/or the outer side (12a) of said sensor unit (12) is coated with an NO-selective membrane.

5. The device of claim 1, wherein said tubular sensor unit (12) is arranged substantially centrally within the intake line (14).

6. The device of claim 1, wherein a baffle plate (18) is provided upstream of the location (17c) where said exhaust gas recirculation line (17b) opens into said intake line (14) for deflecting said exhaust gas flow emanating from said exhaust gas recirculation line (17b) and mixing it with the intake air flow in the intake line (14).

* * * * *